United States Patent
Hessel

(10) Patent No.: US 11,897,636 B2
(45) Date of Patent: Feb. 13, 2024

(54) ROCKET PROPULSION SYSTEM, METHOD, AND SPACECRAFT

(71) Applicant: ArianeGroup GmbH, Taufkirchen (DE)

(72) Inventor: Christian Hessel, Taufkirchen (DE)

(73) Assignee: ArianeGroup GmbH, Taufkirchen (DE)

( * ) Notice: Subject to any disclaimer, the term of this patent is extended or adjusted under 35 U.S.C. 154(b) by 198 days.

(21) Appl. No.: 17/505,785

(22) Filed: Oct. 20, 2021

(65) Prior Publication Data

US 2022/0127019 A1    Apr. 28, 2022

(30) Foreign Application Priority Data

Oct. 23, 2020    (DE) .......................... 102020128007.6

(51) Int. Cl.
| | |
|---|---|
| *B64G 1/40* | (2006.01) |
| *F02K 9/42* | (2006.01) |
| *B64G 1/42* | (2006.01) |
| *F17C 7/02* | (2006.01) |
| *H01M 8/0656* | (2016.01) |

(52) U.S. Cl.
CPC ............ *B64G 1/401* (2013.01); *B64G 1/402* (2013.01); *B64G 1/423* (2013.01); *F02K 9/425* (2013.01); *F17C 7/02* (2013.01); *H01M 8/0656* (2013.01); *F17C 2205/0332* (2013.01); *F17C 2221/011* (2013.01); *F17C 2221/012* (2013.01); *F17C 2223/0161* (2013.01); *F17C 2265/066* (2013.01); *F17C 2270/0197* (2013.01); *H01M 2250/20* (2013.01)

(58) Field of Classification Search
CPC ........ B64G 1/401; B64G 1/402; B64G 1/423; F02K 9/425; F02K 9/42; F02K 9/44; F02K 9/50; F02K 9/56; F02K 9/58; F02K 9/88; H01M 8/0656

See application file for complete search history.

(56) References Cited

U.S. PATENT DOCUMENTS

| | | | |
|---|---|---|---|
| 6,581,882 B2 * | 6/2003 | Valentian ............... | B64G 1/401 60/39.8 |
| 8,950,195 B2 * | 2/2015 | Watts ..................... | B64D 37/02 62/48.2 |
| 9,446,862 B2 * | 9/2016 | Barthoulot ............ | B64G 1/002 |
| 10,707,512 B2 * | 7/2020 | Ahn ...................... | B64D 41/00 |

(Continued)

*Primary Examiner* — Kyle Robert Thomas
(74) *Attorney, Agent, or Firm* — Greer, Burns & Crain, Ltd.

(57) ABSTRACT

A rocket propulsion system comprising a first cryogenic tank and a second cryogenic tank, wherein the first cryogenic tank is filled with a first propellant, and the second cryogenic tank is filled with a second propellant, for purposes of feeding at least one repeatedly ignitable main propulsion unit in a propulsion phase of the rocket propulsion system. For purposes of tank pressurization via at least a low level of acceleration in a ballistic phase, a first auxiliary propulsion unit can be operated by means of a first gas pressure accumulator, and at least one further auxiliary propulsion unit can be operated by means of a further gas pressure accumulator, and the rocket propulsion system is assigned an energy conversion unit, which is designed at least to charge the first and the second gas pressure accumulator, preferably in the ballistic phase.

16 Claims, 1 Drawing Sheet

(56) References Cited

U.S. PATENT DOCUMENTS

| | | |
|---|---|---|
| 2002/0139902 A1 | 10/2002 | Valentian |
| 2014/0203148 A1 | 7/2014 | Barthoulout et al. |
| 2016/0237952 A1* | 8/2016 | Caratge .................. F02K 9/58 |
| 2017/0254296 A1 | 9/2017 | Weldon et al. |

* cited by examiner

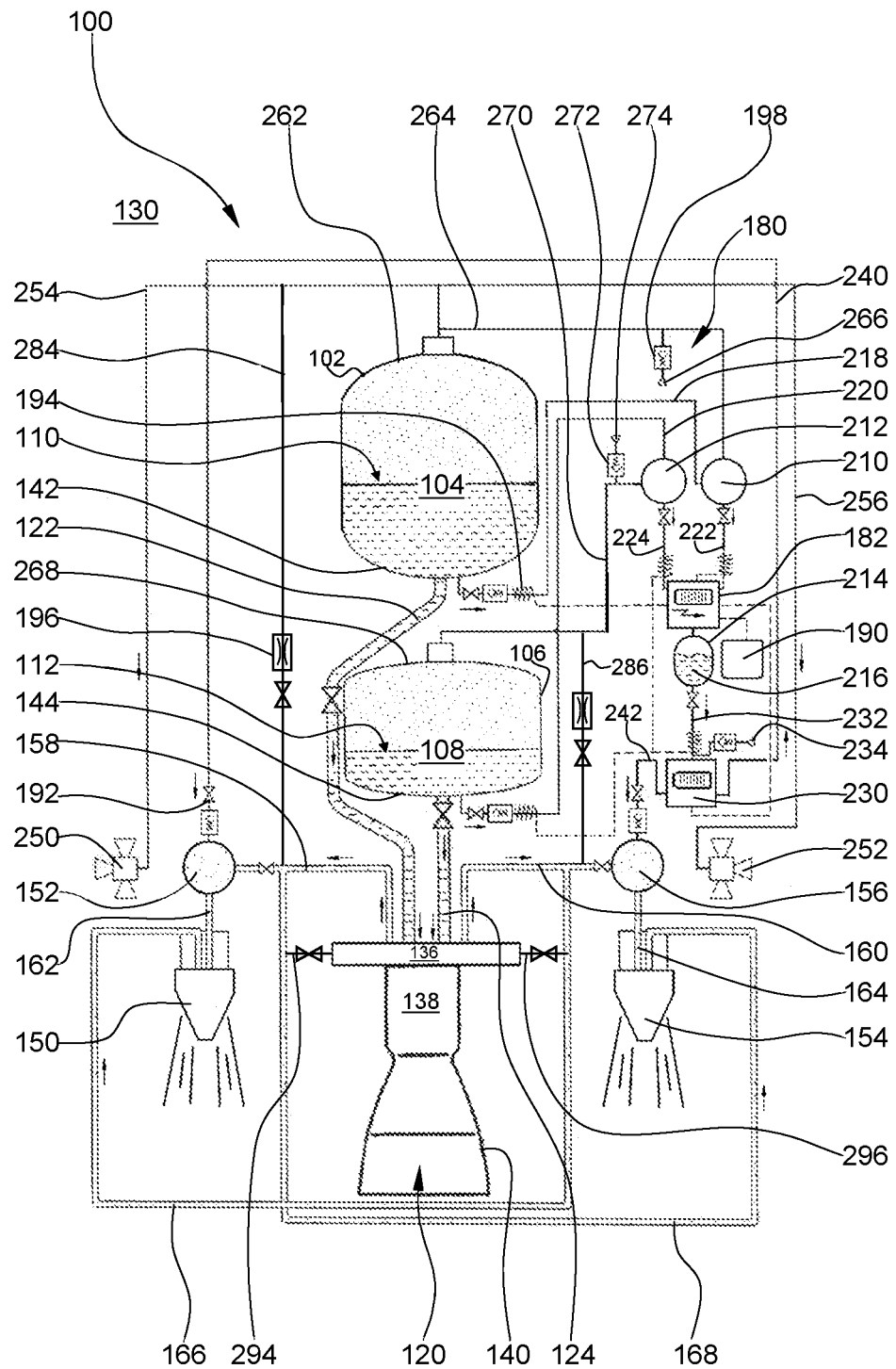

ROCKET PROPULSION SYSTEM, METHOD, AND SPACECRAFT

CROSS-REFERENCES TO RELATED APPLICATIONS

This application claims the benefit of the German patent application No. 102020128007.6 filed on Oct. 23, 2020, the entire disclosures of which are incorporated herein by way of reference.

FIELD OF THE INVENTION

The invention relates firstly to a rocket propulsion system comprising a first cryogenic tank and a second cryogenic tank, wherein the first cryogenic tank is filled with a first propellant, and the second cryogenic tank is filled with a second propellant, for purposes of feeding at least one repeatedly ignitable main propulsion unit in a propulsion phase of the rocket propulsion system.

BACKGROUND OF THE INVENTION

US 2014/0203148 A1 discloses a cryogenic propulsion unit arrangement. The above-cited cryogenic propulsion unit comprises, inter alia, a re-ignitable main propulsion unit and a first cryogenic tank, which is connected to the main propulsion unit so as to supply it with a first propellant. Also provided are a first gas tank and at least one auxiliary propulsion unit. A first supply circuit of the first gas tank is connected to the first cryogenic tank and comprises a heat exchanger so as to vaporize, with heat released from the at least one auxiliary propulsion unit, a flow of liquid of the first propellant, delivered from the first cryogenic tank by means of a pump. By this means the first gas tank can be fed with the first propellant in a gaseous state.

Charging of the two gas tanks is only intended when the main propulsion unit is active, or auxiliary propulsion units are active. It is not possible to feed the auxiliary propulsion units from the gas tanks. In addition, the generation of electrical energy by the utilization of evaporating propellant, for example, is not envisaged.

SUMMARY OF THE INVENTION

One of the objects of the invention is to specify a rocket propulsion system with increased energy efficiency and reduced mass in order to enable a higher payload of a rocket or spacecraft equipped with the rocket propulsion system. A further object of the invention is to specify a method for the operation of such a rocket propulsion system, together with a spacecraft equipped with such a rocket propulsion system.

The object first cited is firstly solved in that, for tank pressurization by means of at least a low level of acceleration in a ballistic phase, a first auxiliary propulsion unit can be operated by means of a first gas pressure accumulator, and at least one further auxiliary propulsion unit can be operated by means of a further gas pressure accumulator, and the rocket propulsion system is assigned an energy conversion unit, which is designed at least to charge the first and the second gas pressure accumulators, preferably in the ballistic phase.

The propulsion phase of the rocket propulsion system is essentially characterized by the active main propulsion unit ("boost phase"), whereas in the ballistic phase the main propulsion unit is inactive, and at least one auxiliary propulsion unit, that is to say, a so-called "distribution propulsion unit" is active. During the ballistic phase, propellant can be withdrawn from at least one gas pressure accumulator in order to pressurize the cryogenic tanks, and at least a low level of thrust can be generated by means of the auxiliary propulsion units supplied by the two gas pressure accumulators in order to achieve a distribution movement of the propellants in the direction of the lower surfaces of the tanks. Furthermore, the energy conversion unit in accordance with the invention enables the generation of electrical energy, so that no conventional APU (a so-called auxiliary propulsion unit), that is to say, no electrical generator, etc., driven by an internal combustion engine, is required for power generation, resulting in a further weight saving. The energy conversion unit enables an optimum utilization of the propellant. Furthermore, no (turbo) pumps or compressors driven by gas engines or internal combustion engines are required within the energy conversion unit for purposes of storing the highly compressed, that is to say, high-energy gaseous phases of the propellants in the gas pressure accumulators. Furthermore, heat exchangers are unnecessary in this context. During power generation, non-propellant masses, such as vaporized, gaseous propellant, can be utilized, which would otherwise be released unused into space. Furthermore, no heavy inert gas vessels for the pressurization of the cryogenic tanks are required, resulting in a further weight reduction of the rocket propulsion system. In comparison to conventional solutions, this results in a considerable increase in the energy efficiency of the rocket propulsion system, which enables an increase in the payload. Instead of the first and second gas pressure accumulators, absorbing metal hydride tanks, or adsorbing tanks, such as metal-organic frameworks, can also be envisaged.

In an advantageous configuration, the first gas pressure accumulator can be charged in the propulsion phase by means of a first main bleed line of the main propulsion unit, and the second gas pressure accumulator can be charged in the propulsion phase by means of a second main bleed line of the main propulsion unit. By this means a rapid charging of the gas pressure accumulators in the propulsion phase of a rocket equipped with the rocket propulsion system is ensured. In the gas pressure accumulators, the gaseous phases of the propellants are in each case subject to a very high pressure of up to 200 bar.

The energy conversion unit preferably has at least one fuel cell for purposes of generating electrical energy, and a control and/or regulation unit is arranged downstream of the fuel cell for comprehensive control of the rocket propulsion system. By this means, inter alia, non-propulsion propellant masses, that is to say, masses of gaseous propellant that can no longer be utilized by the main propulsion unit and the auxiliary propulsion units, can be used to generate electricity. With the aid of the control and/or regulation unit, it is also preferably possible to regulate and/or control all shut-off valves, electrical (resistance) heating elements, (turbo) pumps, motors, actuators, as well as sensors for propellant conditioning within the rocket propulsion system. In the context of the present description, the term propellant conditioning relates in particular to the temperature and/or the pressure of the propellants.

In a beneficial configuration, provision is made for the fuel cell to have a first reception chamber for the first propellant, and a second reception chamber for the second propellant, and a reception vessel for a reaction product of the first and second propellants is assigned to the fuel cell. The reception chambers, that is to say, the internal cavities of the fuel cell primarily serve only as distributors to enable and equalize the reception of the different inflows of gaseous and/or liquid propellants from the tanks, the propulsion unit and the gas pressure accumulators. The reception chambers of the fuel cell are therefore relatively small in volume and are designed with a limited buffer effect. Only in the feed lines leading to the fuel cell are the propellants still predominantly in the liquid phase and can be conveyed. Within the reception chambers themselves, however, the propellants must be in the gaseous phase; this can be achieved, for example, with the aid of electrical (resistance) heating elements, and/or by using the heat loss of the fuel cell.

In a beneficial development, at least one high-pressure electrolysis cell is assigned to the energy conversion unit, which is preferably operated with the electrical energy provided by the fuel cell, in order to split the supplied reaction product back into the first propellant and into the second propellant, in each case in the gaseous phase, wherein the gaseous phases of the propellants are subject to a high pressure. This enables an energy reconversion in accordance with the so-called "gas-to-power-to-gas" principle in space (in orbit). If required, the function of the high-pressure electrolysis cell can also be taken over by a suitable fuel cell, although in such a configuration power generation and electrolysis cannot be implemented simultaneously. In addition, an electrical buffer storage unit, such as a chemical tank, a high-capacity capacitor (a so-called "super-capacitor" or "ultra-capacitor"), a capacitor battery, a coil, etc., can be assigned to the fuel cell for the temporary storage of the electrical energy generated by the fuel cell, and so as to be able to deliver it quickly to the high-pressure electrolysis cell as required.

In an advantageous configuration, provision is made for the first gaseous propellant to be stored in the first gas pressure accumulator, starting from the high-pressure electrolysis cell, by means of a first supply line, and the second gaseous propellant to be stored in the second gas pressure accumulator, starting from the high-pressure electrolysis cell, by means of a second supply line. By this means, the gas pressure accumulators can be charged independently of the main propulsion unit.

In accordance with another development, at least two maneuvering thrusters can preferably be supplied by means of a first evaporation line, arranged in the region of an upper surface of the first cryogenic tank in each case, and/or from the gas pressure accumulators. By this means, inter alia, minor course corrections of a spacecraft equipped with the rocket propulsion system in accordance with the invention are possible, as are minor course corrections of a rocket (upper) stage with residual gaseous propellant quantities that are in any event present.

At least one safety valve is preferably arranged in the region of each of the first and second evaporation lines. As a consequence, reliable protection against possible overpressure is provided. The safety valves further ensure that in the event of decommissioning of the spacecraft equipped with the rocket propulsion system, no closed volume with residues of the cryogenic propellants remains in space. A closed volume filled with propellant residues could otherwise burst, and lead to an increase in the quantity of space debris.

In an advantageous configuration, the main propulsion unit has a supply unit, a combustion chamber and an outlet nozzle, wherein the supply unit is connected to a lower surface of the first cryogenic tank by means of a first main line, and to a lower surface of the second cryogenic tank by means of a second main line. By means of the supply unit, which preferably comprises at least two delivery elements, such as, for example, two (turbo) pumps, the combustion chamber of the main propulsion unit can be fed via the main line with large volumetric flows of both propellants in the liquid phase.

In a beneficial configuration, the first propellant is preferably hydrogen in a liquid and/or gaseous phase, and the second propellant is preferably oxygen in a liquid and/or gaseous phase. Hydrogen as the first propellant, and oxygen as the second propellant, represent the preferred high-energy combination for the operation of the rocket propulsion system, and for the energy conversion device. Notwithstanding the above, a combination of methane as the first propellant, and oxygen as the second propellant is, for example, conceivable. The first propellant, that is to say, the actual fuel, and the second propellant or oxidizer are both present in a cryogenic form (LH2/LOX or LCH4/LOX and other combinations of materials).

The above-cited object is furthermore solved by a method, according to which, in the propulsion phase, the first and the second gas pressure accumulators are preferably charged by means of the respectively associated main bleed lines. In principle, this enables the gas pressure accumulators to be loaded particularly quickly and efficiently. However, if a large volume of the propellants has boiled off following a ballistic phase of a spacecraft equipped with the rocket propulsion system (so-called "boil-off" propellant), and the evaporated propellants have been transformed into electrical energy by means of the energy conversion unit, and then converted back into the first and second propellants, in each case in the gaseous phase, by means of the high-pressure electrolysis cell, it is not always possible to recharge the gas pressure accumulators. This is because in such a configuration the gas pressure accumulators are still full, and still have a high pressure of up to 200 bar. If, in this situation, a brief propulsion phase of, for example, 20 seconds is initiated by firing the main propulsion unit, which can be necessary, for example, when a spacecraft equipped with the rocket propulsion system enters lunar orbit, the two propellants of the main propulsion unit are provided in the gaseous phase at a pressure of only 100 bar via the bleed line. The pressure in the main bleed lines is thus significantly lower than the pressure of the gaseous propellants stored in the gas pressure accumulators. In this case, the gaseous propellants would only be used, if at all, to pressurize the tanks during the propulsion phase of the spacecraft when the main propulsion unit is activated, but not to charge the gas pressure accumulators. However, if extremely low temperatures prevailed during the ballistic phase of the rocket propulsion system, which is the case, for example, when flying through the shadow of the moon, and the gaseous propellants in the gas pressure accumulators are subject to a pressure significantly lower than 200 bar, the gas pressure accumulators can be charged without any problems during the propulsion phase of the rocket propulsion system, that is to say, when the main propulsion unit is ignited.

In accordance with another advantageous development of the method, in the ballistic phase the first and the second gas pressure accumulators are preferably charged by means of the energy conversion unit. As a result, the gas pressure accumulators can be charged independently of the main propulsion unit. In addition, the gas pressure accumulators can also be charged by means of the main propulsion unit, or by means of the high-pressure electrolysis cell. In the propulsion phase, however, charging with the main propulsion unit is preferred, provided that the current pressure in the gas pressure accumulators permits this. This is the case if the pressure of the gaseous propellants in the gas accumulators is lower than the pressure in the main bleed lines of the main propulsion unit. During the ballistic phase of the spacecraft equipped with the rocket propulsion system, the gas pressure accumulators can be charged or recharged at any time by means of the inventive energy conversion unit.

In accordance with a further configuration of the method, thrust is generated primarily by means of the main propulsion unit in the propulsion phase, and in the ballistic phase by means of the at least one auxiliary propulsion unit supplied by the at least two gas pressure accumulators. In this way, at least a low level of acceleration can be maintained, even in the ballistic phase, of a spacecraft equipped with the rocket propulsion system, so that the propellants settle preferably in the region of the lower surfaces of the tank and any re-ignition of the main propulsion unit is possible, without any problems, by sucking in the propellants with the aid of the (turbo) pumps of the main lines.

Furthermore, the above-cited object is achieved by a spacecraft equipped with at least one rocket propulsion system. As a consequence, the payload of the spacecraft is increased, inter alia, by virtue of the significant increase in efficiency of the rocket propulsion system. The spacecraft can be, for example, an upper stage, or a final stage, of a multi-stage rocket, a space transporter, a satellite, a manned spaceship, or an unmanned space probe for earth orbit or an interplanetary orbit.

BRIEF DESCRIPTION OF THE DRAWINGS

In what follows, a preferred example of embodiment of the invention will be explained in more detail with reference to a schematic figure. Here:
The FIGURE shows a highly simplified diagram of a rocket propulsion system in accordance with the invention.

DETAILED DESCRIPTION OF THE PREFERRED EMBODIMENTS

The FIGURE illustrates a highly simplified diagram of a rocket propulsion system in accordance with the invention. A rocket propulsion system 100, or a complete rocket propulsion unit, comprises, inter alia, a first cryogenic tank 102 for the storage of a first propellant 104, and a second cryogenic tank 106 for the storage of a second propellant 108, wherein a main propulsion unit 120, which can be ignited multiple times, can be supplied with the propellants 104, 108 in a liquid phase by way of a first and a second main line 122, 124. Feeding of the main propulsion unit 120 with the propellants 104, 108 by way of the main lines 122, 124 takes place, for example, in a propulsion phase, or a so-called boost phase, or a launch phase, of a spacecraft 130 (not shown) equipped with the rocket propulsion system 100. If necessary, the propulsion phase of the spacecraft 130 can also be initiated in space by the ignition of the main propulsion unit 120. The spacecraft 130 can take the form, for example, of an upper stage or a final stage of a multi-stage rocket, a space transporter, a satellite, a manned spaceship, a lander, or an unmanned space probe for earth orbit or an interplanetary orbit, etc.

The main propulsion unit 120 has a central supply unit 136 and a combustion chamber 138 with an outlet nozzle 140, wherein the supply unit 136 is connected by means of the first main line 122 in the region of a lower surface 142 of the first cryogenic tank 102, and by means of the second main line 124 in the region of a lower surface 144 of the second cryogenic tank 106. The supply unit 136 can feature, for example, (turbo) pumps (not shown), heat exchangers, electrical (resistance) heating elements for temperature control or conditioning of the propellants 104, 108 supplied by means of the main lines 122, 124, etc. Each of the main lines 122, 124 has a shut-off valve, which is not designated in the interests of drawing clarity. A preferred direction of flow of the liquid and/or gaseous cryogenic propellants 104, 106 is indicated in FIG. 1 by black arrows, which are likewise not designated in the interests of drawing clarity. In the interests of drawing clarity, electrical control lines are only partially shown and are symbolized by dashed black lines. Above a liquid level 110 in the first tank 102, the first propellant 104 is essentially entirely in the gaseous phase. Correspondingly, above a liquid level 112 in the second tank 106, the second propellant 108 is also essentially entirely in the gaseous phase.

Inter alia, for the pressurization of the two tanks 102, 106 in a so-called ballistic phase of the spacecraft 130 in orbit, a first auxiliary propulsion unit 150 can be operated by means of a first gas pressure accumulator 152 and a second auxiliary propulsion unit 154 can be operated by means of a second gas pressure accumulator 156. At least one of the auxiliary propulsion units 150, 154 is active in the ballistic phase in weightless orbit, in order to maintain the propellants 104, 108 in a liquid and/or a gaseous form in a defined manner in the region of the lower surfaces 142, 144 of the tanks 102, 106, by the maintenance of at least a low level of acceleration.

The first gas pressure accumulator 152 can be charged, inter alia, by means of a first main bleed line 158, and the second gas pressure accumulator 156 can be charged by means of a second main bleed line 160, starting from the supply unit 136 of the main propulsion unit 120, wherein each of the main bleed lines 158, 160 in turn has a shut-off valve (not designated). The gas pressure accumulators 152, 156 each contain the propellants 104, 108 in a preferably gaseous form, and subject to a high pressure of up to 200 bar. The first gas pressure accumulator 152 is connected to the first auxiliary propulsion unit 150 by means of a first supply line 162, while the second gas pressure accumulator 156 is connected to the second auxiliary propulsion unit 154 by means of a second supply line 164. In order to be able to feed the two auxiliary propulsion units 150, 154 with both propellants 104, 106 respectively, a first and a second cross-over line 166, 168 are provided, wherein the first cross-over line 166 is connected to the second main bleed line 160, and the second cross-over line 168 is connected to the first main bleed line 158 of the supply unit 136 of the main propulsion unit 120.

In accordance with the invention, the rocket propulsion system 100 is assigned an energy conversion unit 180, which is designed to charge at least the first and second gas pressure accumulators 152, 156, preferably during the ballistic phase of the spacecraft 130.

The energy conversion unit 180 comprises, inter alia, at least one fuel cell 182 for the conversion of chemical energy into electrical energy. Associated with the at least one fuel cell 182 is at least one high performance digital control and/or regulation unit 190 for purposes of controlling the flow of electrical power within the rocket propulsion system 100. In addition, the control and/or regulation unit 190 is preferably configured for purposes of controlling all electrically operable shut-off valves, (turbo) pumps, actuators, motors, and electrical heating elements within the rocket propulsion system 100. Of the electrically operable shut-off valves, only one shut-off valve 192 is designated, as a representative of all others, in the interests of drawing clarity. The same applies to the multiplicity of electrical (resistance) heating elements, of which only one electrical (resistance) heating element 194 is designated. Furthermore, only one throttle valve 196 and one spring-loaded check valve 198 are designated, as representatives of all other throttle valves and spring-loaded check valves.

The fuel cell 182 has a first reception chamber 210, that is to say, a first fuel cell internal cavity, for the first propellant 104, and a second reception chamber 212, that is to say, a second fuel cell internal cavity, for the second propellant 108. The first reception chamber 210 is connected to the first tank 102 by means of a first feed line 218 in the region of the lower surface 142 of the first tank 102. Correspondingly, the second reception chamber 212 is connected to the second tank 106 by means of a second feed line 220, in the region of the lower surface 144 of the second tank 106. In each of the feed lines 218, 220 there is a shut-off device, an electrical (resistance) heating element and a spring-loaded non-return valve, which are not designated in the interests of drawing clarity, wherein the shut-off devices and the electrical (resistance) heating elements can in each case preferably be individually controlled by means of the control and/or regulation unit 190. Furthermore, a reception vessel 214 for a reaction product 216 from the first and second propellants 104, 108 is provided downstream of the fuel cell 182.

The control and/or regulation unit 190 is designed to maintain all operating conditions of the rocket propulsion system 100, in particular the relevant temperature and pressure ranges. Here, inter alia, the complex internal control of the energy conversion unit 180, that is to say, of the (resistance) heating elements for the temperature control of the propellants 104, 108, takes place. If, for example, the propellants 104, 108 are too cold for the operation of the fuel cell, the temperature of the propellant 104, 108 in question can be controlled appropriately by means of an electrical (resistance) heating element. Active cooling elements, such as Peltier elements, are in general not provided within the rocket propulsion system 100. The propellants 104, 108 in the tanks 102, 106 can be temperature controlled, for example, by the opening of associated shut-off valves, and the accompanying lowering of pressures within the tanks 102, 106, since the propellants 104, 108 cool by evaporation during this process. The propellants 104, 108 that are present in gaseous phase above the respective liquid levels 110, 112 in the tanks 102, 106 can then be converted to electricity by means of the energy conversion unit 180, and no longer end up in space unused. Since thermal energy, that is to say, heat is released during this process, cooling of the fuel cell 182 by means of the cold gaseous propellants 104, 108 is possible. In this case, active (resistive) heating elements can be omitted, since the corresponding pre-heating of the propellants 104, 108 is ensured by way of the waste heat of the fuel cell 182 in the course of its cooling. A first supply line 222 is further provided between the first reception chamber 210 and the fuel cell 182, and a second supply line 224 is provided between the second reception chamber 212 and the fuel cell 182, each of which lines has a shut-off device and an electrical (resistance) heating element, which can be controlled by the control and/or regulation unit 190. These (resistance) heating elements serve to preheat the gaseous propellants 104, 108 within the reception chambers 210, 212 of the fuel cell 182, in a manner that is suitable for the fuel cell.

Downstream of the fuel cell 182 of the energy conversion unit 180 is also located at least one high-pressure electrolysis cell 230, which can preferably be operated with the electrical energy provided by the fuel cell 182, and which can be supplied with the liquid reaction product 216 from the reception vessel 214. By this means, the reaction product 216 can in turn be split into the first and second propellants 104, 108, each in a gaseous phase. In the case in which the first propellant 104 is hydrogen and the second propellant 108 is oxygen, the reaction product 216 takes the form of chemically pure water. The gaseous propellants 104, 108 are here subject to a high pressure of up to 200 bar. The reception vessel 214 is connected to the high-pressure electrolysis cell 230 by means of a connecting line 232 for the supply of the reaction product 216. The connecting line 232 in turn has a shut-off device (not designated) and an electrical (heating) resistance element, which can preferably be controlled by the control and/or regulation unit 190. In addition, a spring-loaded check valve (not designated) is connected to the connecting line 232 downstream of the electrical (resistance) heating element, with a downstream safety valve 234, that is to say, a pressure relief valve.

Starting from the high-pressure electrolysis cell 230, the gaseous first propellant 104 can be stored in the first gas pressure accumulator 152 by means of a first supply line 240, and the gaseous second propellant 108 can be stored in the second gas pressure accumulator 156 by means of a second supply line 242. The supply lines 240, 242 each have a shut-off device that can be controlled by the control and/or regulation unit 190, together with a spring-loaded check valve, so that no propellant 104, 108 can flow back from the gas pressure accumulators 152, 156 into the high-pressure electrolysis cell 230, irrespective of the respective opening state of the shut-off devices.

If necessary, for example in the event of excess power, the electrical energy or power generated with the aid of the fuel cell 182 can be temporarily stored in an electrical buffer storage unit (not shown), as a further component of the energy conversion unit 180. Suitable options for an electrical buffer storage unit can include, for example, a chemical tank, a high-capacity capacitor (a so-called "super-capacitor" or "ultra-capacitor"), a capacitor bank, a superconducting coil, or similar. As a result, a time-displaced operation of the high-pressure electrolysis cell 230 is possible by means of the electrical energy generated by the fuel cell 182. In principle, the electrical energy generated by means of the fuel cell 182 can be used to operate any electrical loads that are present within the rocket propulsion system 100. These include, for example, (turbo) pumps, the high-pressure electrolysis cell 230, electrically operable shut-off valves, (resistive) heating elements, the control and/or regulation unit 190, motors, actuators, sensors, or similar.

Furthermore, the rocket propulsion system 100 here has, just by way of example, a first and a second (cold gas) maneuvering thruster 250, 252, which are preferably intended for attitude control of the spacecraft 130 when in orbit. The first maneuvering thruster 250 can be supplied with the first propellant 104, preferably in gaseous form, by means of a first line 254, connected in the region of an upper surface 262 of the tank 102. Correspondingly, the second maneuvering thruster 252 can be supplied with the gaseous first propellant 104 by means of a second line 256, which is likewise preferably connected in the region of the upper surface 262 of the first tank 102. For purposes of controlling the maneuvering thrusters 250, 252, shut-off valves (not shown) are provided in the lines 254, 256; these can be controlled electrically by the control and/or regulation unit 190.

Furthermore, a first evaporation line 264 is provided in the region of the upper surface 262 of the first cryogenic tank 102 for purposes of feeding the first propellant 104 to the first reception chamber 210 of the fuel cell 182. A check valve 198 is connected to the first evaporation line 264, downstream of which, in turn, is located a safety valve 266, that is to say, a pressure relief valve. Correspondingly, a second evaporation line 270 is also provided in the region of an upper surface 268 of the second cryogenic tank 106 for purposes of supplying the second propellant 108 in a gaseous phase to the second reception chamber 212 of the fuel cell 182. A check valve 272 is again connected to the second evaporation line 270, downstream of which is located a safety valve 274.

Here the maneuvering thrusters 250, 252 can be supplied, just by way of example, by means of the evaporation line 264 of the first tank 102, which in turn is connected to the first and second lines 254, 256 of the maneuvering thrusters 250, 252, and/or by means of other lines (not shown) from the two gas pressure accumulators 152, 156. Gaseous propellant 104 from the first tank 102 has an extremely low temperature, and also a very low pressure of about 1.3-4.0 bar. If the maneuvering thrusters 250, 252 are supplied with the latter, only a low specific impulse of 80 s to 120 s can be generated. By feeding the maneuvering thrusters 250, 252 from one of the two gas pressure accumulators 152, 156, on the other hand, a specific impulse at least twice as high can be generated, so that, if necessary, more extensive control maneuvers of the spacecraft, such as orbit corrections, can be carried out.

The two reception vessels 210, 212 of the fuel cell 182, which can also be supplied by means of the evaporation lines 264, 270, can receive propellant 104, 108 in a gaseous phase, both in the propulsion phase and also in the ballistic phase of the rocket propulsion system 100. In the ballistic phase, the reception occurs when sufficient evaporating propellant 104, 108 is available via the evaporation lines 264, 270 or sufficient liquid propellant 104, 108 is available via the feed lines 218, 220 at at least a low level of acceleration.

Furthermore, two branch lines 284, 286 (so-called "tap-off lines") are provided in the rocket propulsion system 100, wherein the first branch line 284 is connected between the first line 254, or the first evaporation line 264, and the first main bleed line 158 and, correspondingly, the second branch line 286 is connected between the second evaporation line 270 and the first main bleed line 160. Inter alia, the branch lines 284, 286 serve to stabilize pressure in the tanks 102, 106 when the main propulsion unit 120 is active during the propulsion phase of the spacecraft 130 under zero gravity conditions, or during launch. In addition, the branch lines 284, 286 serve to control the two gas pressure accumulators 152, 156. In each of the branch lines 284, 286, a passive throttle valve, together with a shut-off valve that can be actuated electrically by means of the control and/or regulation unit 190, are provided; these are also not designated in the interests of drawing clarity.

There is also a first cooling line 294 (a so-called "chill-down line") located between the cross-over line 166 and the supply unit 136 of the main propulsion unit 120, and a second cooling line 296 (another so-called "chill-down line") is located between the cross-over line 168 and the supply unit 136 of the main propulsion unit 120; each of these lines has a shut-off valve (not designated) that can be operated electrically by means of the control and/or regulation unit 190. The chill-down lines 294, 296 are designed, inter alia, to cool the main propulsion unit 120 immediately prior to its ignition, wherein the (turbo) pumps within the supply unit 136 are cooled at the same time. As a result, vapor bubble formation and thus any extremely undesirable cavitation effects are avoided during the start-up of the main propulsion unit 120.

The first propellant 104 takes the form, for example, of gaseous and/or liquid hydrogen, while gaseous and/or liquid oxygen is generally used as the second propellant 108, that is to say, as a so-called oxidizer. Instead of hydrogen, methane in a liquid and/or a gaseous phase can also be used.

In addition, the subject matter of the invention includes a method for the operation of the rocket propulsion system 100.

In accordance with the method, the first and the second gas pressure accumulators 152, 156 are charged, preferably in the propulsion phase of the rocket propulsion system 100, by means of the respectively associated main bleed lines 158, 160. Furthermore, in the propulsion phase and/or the ballistic phase of the spacecraft 130 equipped with the rocket propulsion system 100, the first and the second gas pressure accumulators 152, 156 can preferably be charged by means of the supply unit 136 of the main propulsion unit 120, and/or by means of the high-pressure electrolysis cell 230 supplied with electrical energy by the fuel cell 182 and/or by the electrical buffer storage unit.

In accordance with the method, in the propulsion phase of the rocket propulsion system 100, thrust is generated primarily by means of the main propulsion unit 120, and in the ballistic phase by means of the at least two auxiliary propulsion units, supplied by the at least two gas pressure accumulators 152, 156.

In the ballistic phase, the auxiliary propulsion units 150, 154 of the rocket propulsion system 100 are operated; these are fed with the propellants 104, 108, stored separately in the gas pressure accumulators 152, 156 respectively. For any re-ignition of the main propulsion unit 120, it is necessary for the propellants 104, 108 to be in the liquid phase, located in the region of the lower surfaces 142, 144 of the tanks 102, 106. Pressurization of the tanks 102, 106 only plays a role in the thermal conditioning of the propellants 104, 108, for example if they are too warm for the main propulsion unit 120, and cooling of the propellants 104, 108 by controlled evaporation is essential. The gaseous propellants 104, 108 generated in the course of this process can then be at least partially reused with the aid of the energy conversion unit 180, by storing them in the respective gas pressure accumulators 152, 156.

In addition, the invention relates to the spacecraft 130 equipped with the rocket propulsion system 100.

As a result, the rocket propulsion system 100 in accordance with the invention exhibits a considerably increased energy efficiency, since the gaseous propellants 104, 108 which are in general released in the course of operation no longer have to be discharged unused into space, but instead are supplied for specific energetic reuse by the energy conversion unit 180.

The invention relates to a rocket propulsion system 100, comprising a first cryogenic tank 102 and a second cryogenic tank 106, wherein the first cryogenic tank 102 is filled with a first propellant 104, and the second cryogenic tank 106 is filled with a second propellant 108, for purposes of feeding at least one repeatedly ignitable main propulsion unit 120 in a propulsion phase of the rocket propulsion system 100. In accordance with the invention, for purposes of tank pressurization by means of at least a low level of acceleration in a ballistic phase, a first auxiliary propulsion unit 150 can be operated by means of a first gas pressure accumulator 152, and at least one further auxiliary propulsion unit 154 can be operated by means of a further gas pressure accumulator 156, and the rocket propulsion system 100 is assigned an energy conversion unit 180, which is designed at least to charge the first and the second gas pressure accumulators 152, 156, preferably in the ballistic phase. As a result, the rocket propulsion system 100 is particularly energy efficient, which allows, inter alia, an increase in the payload of a spacecraft 130 equipped with the rocket propulsion system 100.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SYMBOLS

100 Rocket propulsion system
102 First cryogenic tank
104 First propellant (fuel)
106 Second cryogenic tank
108 Second propellant (oxidizer)
110 Liquid level (first tank)
112 Liquid level (second tank)
120 Main propulsion unit
122 First main line
124 Second main line
130 Spacecraft
136 Supply unit (main propulsion unit)
138 Combustion chamber
140 Outlet nozzle
142 Lower surface (first tank)
144 Lower surface (second tank)
150 First auxiliary propulsion unit
152 First gas pressure accumulator
154 Second auxiliary propulsion unit
156 Second gas pressure accumulator
158 First main bleed line
160 Second main bleed line
162 First supply line (auxiliary propulsion unit)
164 Second supply line (auxiliary propulsion unit)
166 Crossover line
168 Cross-over line
180 Energy conversion unit
182 Fuel cell
190 Control and/or regulation unit
192 Shut-off valve
194 Electrical heating element
196 Throttle valve
198 Spring-loaded check valve
210 First reception chamber (fuel cell)
212 Second reception chamber (fuel cell)
214 Reception vessel
216 Reaction product
218 First feed line
220 Second feed line
222 First supply line
224 Second supply line
230 High-pressure electrolysis cell
232 Connecting line
234 Safety valve
240 First supply line
242 Second supply line
250 First maneuvering thruster
252 Second maneuvering thruster
254 First line
256 Second line
262 Upper surface (first tank)
264 First evaporation line
266 Safety valve
268 Upper surface (second tank)
270 Second evaporation line
272 Check valve
274 Safety valve
284 First branch line
286 Second branch line
294 First cooling line
296 Second cooling line

The invention claimed is:

1. A rocket propulsion system comprising
a first cryogenic tank for a first propellant,
a second cryogenic tank for a second propellant,
at least one repeatedly ignitable main propulsion unit configured to be fed, in a propulsion phase of the rocket propulsion system, by the first and the second cryogenic tank,
a first auxiliary propulsion unit operable in a ballistic phase by means of a first gas pressure accumulator, and
at least one further auxiliary propulsion unit operable in a ballistic phase by means of a second gas pressure accumulator,
wherein the rocket propulsion system is assigned an energy conversion unit, which is configured at least to charge the first and the second gas pressure accumulator,
wherein the energy conversion unit has at least one fuel cell configured to generate electrical energy,
the fuel cell having a first reception chamber for the first propellant, and a second reception chamber for the second propellant,
wherein a first evaporation line is provided in a region of an upper surface of the first cryogenic tank and configured to feed the first propellant in a gaseous phase to the first reception chamber,
and a second evaporation line is provided in a region of an upper surface of the second cryogenic tank and configured to supply the second propellant in a gaseous phase to the second reception chamber.

2. The rocket propulsion system according to claim 1, wherein the rocket propulsion system is configured at least to charge the first and the second gas pressure accumulator in the ballistic phase.

3. The rocket propulsion system according to claim 1, wherein the first gas pressure accumulator is chargeable in the propulsion phase by means of a first main bleed line of the main propulsion unit, and the second gas pressure accumulator is chargeable in the propulsion phase by means of a second main bleed line of the main propulsion unit.

4. The rocket propulsion system according to claim 1, wherein the energy conversion unit has at least one of a control or regulation unit for the comprehensive control of the rocket propulsion system is located downstream of the fuel cell.

5. The rocket propulsion system according to claim 4, wherein the fuel cell is assigned a reception vessel for a reaction product of the first and second propellants.

6. The rocket propulsion system according to claim 5, wherein the energy conversion unit is assigned at least one high-pressure electrolysis cell, which is operated with the electrical energy provided by the fuel cell, in order to split the supplied reaction product again into the first propellant and into the second propellant, in each case in a gaseous phase of the first and second propellants, wherein the gaseous phases of the first and second propellants are subject to a high pressure.

7. The rocket propulsion system according to claim 6, wherein starting from the high-pressure electrolysis cell, the first gaseous propellant is storable by means of a first feed line in the first gas pressure accumulator, and starting from the high-pressure electrolysis cell, the second gaseous propellant can be stored by means of a second feed line in the second gas pressure accumulator.

8. The rocket propulsion system according claim 1, wherein at least two maneuvering thrusters are supplied at least one of
by means of a respective line, arranged in a region of an upper surface of the first cryogenic tank, or
from the gas pressure accumulators.

9. The rocket propulsion system according to claim 1, wherein at least one safety valve is in each case arranged in a region of the first and a second evaporation line.

10. The rocket propulsion system according to claim 1,
wherein the main propulsion unit has a supply unit, a combustion chamber, together with an outlet nozzle, and
wherein the supply unit is connected by means of a first main line to a lower surface of the first cryogenic tank, and by means of a second main line to a lower surface of the second cryogenic tank.

11. The rocket propulsion system according to claim 1, wherein the first propellant is in at least one of a liquid or a gaseous phase, and the second propellant is in at least one of a liquid or a gaseous phase.

12. The rocket propulsion system according to claim 1, wherein the first propellant is hydrogen and the second propellant is oxygen.

13. A method for operation of a rocket propulsion system according to claim 3, wherein, in the propulsion phase, the first and the second gas pressure accumulators are charged by means of the respectively associated main bleed line of the rocket propulsion system.

14. The method according to claim 13, wherein in the ballistic phase, the first and second gas pressure accumulators are charged by means of the energy conversion unit.

15. The method according to claim 13, wherein in the propulsion phase, thrust is generated primarily by means of the main propulsion unit, and in the ballistic phase, by means of at least one auxiliary propulsion unit, supplied by the at least two gas pressure accumulators.

16. A spacecraft, wherein the spacecraft is equipped with at least one rocket propulsion system according to claim 1.

* * * * *